(12) United States Patent
Yokoyama et al.

(10) Patent No.: US 7,802,429 B2
(45) Date of Patent: Sep. 28, 2010

(54) EXHAUST TURBO-SUPERCHARGER

(75) Inventors: Takao Yokoyama, Nagasaki-ken (JP); Seiichi Ibaraki, Nagasaki-ken (JP); Katsuyuki Osako, Kanagawa-ken (JP); Motoki Ebisu, Kanagawa-ken (JP)

(73) Assignee: Mitsubishi Heavy Industries, Ltd. (JP)

( * ) Notice: Subject to any disclaimer, the term of this patent is extended or adjusted under 35 U.S.C. 154(b) by 172 days.

(21) Appl. No.: 11/581,582

(22) Filed: Oct. 17, 2006

(65) Prior Publication Data

US 2007/0089414 A1 Apr. 26, 2007

(30) Foreign Application Priority Data

Oct. 21, 2005 (JP) ............................. 2005-306505

(51) Int. Cl.
*F02B 33/44* (2006.01)
(52) U.S. Cl. ..................... 60/605.3; 60/605.1
(58) Field of Classification Search ................. 60/605.3
See application file for complete search history.

(56) References Cited

U.S. PATENT DOCUMENTS

| 3,270,951 | A | * | 9/1966 | Reed | ........................... | 60/602 |
| 4,557,665 | A | * | 12/1985 | Szczupak | ................... | 415/158 |
| 4,655,043 | A | * | 4/1987 | McInerney | ................... | 60/602 |
| 4,725,206 | A | * | 2/1988 | Glaser et al. | ................ | 417/407 |
| 4,786,238 | A | * | 11/1988 | Glaser et al. | .................. | 417/53 |

(Continued)

FOREIGN PATENT DOCUMENTS

DE 4330380 A1 3/1995

(Continued)

OTHER PUBLICATIONS

European Search Report of Application No. 06121974.7—1267 / 1785613 mailed Mar. 31, 2010.

(Continued)

*Primary Examiner*—Thomas Denion
*Assistant Examiner*—Douglas J. Duff
(74) *Attorney, Agent, or Firm*—Kanesaka Berner & Partners, LLP

(57) ABSTRACT

An exhaust turbo-supercharger having a high efficiency is provided. The exhaust turbo-supercharger includes therein an exhaust turbine housing including a spiral channel and a turbine-accommodating chamber connected to an innermost peripheral part of the spiral channel; an exhaust turbine provided in the turbine-accommodating chamber so that the axial line of the exhaust turbine is parallel to that of the spiral channel; a shaft that is concentrically connected to one side of the exhaust turbine in the axial line direction; a bearing housing disposed at the side of the exhaust turbine in the axial line direction so as to be adjacent to the exhaust turbine housing; a bearing that is provided in the bearing housing and that rotatably supports the shaft around the axial line; and a heat shield component interposed between the exhaust turbine housing and the bearing housing. The heat shield component constitutes a part disposed near the entrance of the turbine-accommodating chamber, the part being a part of the inner wall surface of the spiral channel. The part composed of the heat shield component, the part being a part of the inner wall surface of the spiral channel, forms a protruding part protruding toward the inside of the channel relative to an upstream part.

6 Claims, 5 Drawing Sheets

U.S. PATENT DOCUMENTS

| | | | |
|---|---|---|---|
| 5,087,176 A * | 2/1992 | Wieland | 417/407 |
| 6,155,780 A * | 12/2000 | Rouse | 415/173.3 |
| 6,694,733 B1 * | 2/2004 | Bernardini et al. | 60/602 |
| 6,928,816 B2 * | 8/2005 | Leavesley | 60/602 |
| 6,962,481 B2 * | 11/2005 | Knauer et al. | 415/160 |
| 7,001,142 B2 * | 2/2006 | Knauer et al. | 415/160 |
| 7,024,855 B2 * | 4/2006 | Perrin et al. | 60/602 |
| 7,097,432 B1 * | 8/2006 | Lombard et al. | 417/295 |
| 7,272,929 B2 * | 9/2007 | Leavesley | 60/602 |
| 7,338,254 B2 * | 3/2008 | Lombard et al. | 415/167 |
| 7,384,236 B2 * | 6/2008 | Meier et al. | 415/178 |
| 7,581,394 B2 * | 9/2009 | Perrin et al. | 60/602 |
| 7,631,497 B2 * | 12/2009 | Panek | 60/605.1 |
| 2003/0150211 A1 | 8/2003 | Fledersnacher et al. | |
| 2003/0194333 A1 | 10/2003 | Sumser et al. | |
| 2006/0037317 A1 * | 2/2006 | Leavesley | 60/602 |
| 2006/0127242 A1 * | 6/2006 | Martin et al. | 417/407 |

FOREIGN PATENT DOCUMENTS

| | | |
|---|---|---|
| EP | 1304445 A2 | 4/2003 |
| JP | 61-49109 A | 3/1986 |
| JP | 08-109801 A | 4/1996 |
| JP | 11-303642 A | 11/1999 |
| JP | 2002-070568 | 3/2002 |
| JP | 2002-70568 A | 3/2002 |
| JP | 2003-120303 | 4/2003 |
| KR | 2005-078656 | 8/2005 |

OTHER PUBLICATIONS

Korean Office Action dated Jun. 27, 2007.

* cited by examiner

EXHAUST TURBO-SUPERCHARGER

BACKGROUND OF THE INVENTION

1. Field of the Invention

The present invention relates to an exhaust turbo-supercharger used in internal combustion engines such as engines of vessels, automobiles, or power generators.

This application is based on Japanese Patent Application No. 2005-306505, the content of which is incorporated herein by reference.

2. Description of Related Art

An exhaust turbo-supercharger forcibly supplies air into a combustion chamber of an internal combustion engine to increase the combustion efficiency, thereby improving the output of the internal combustion engine.

An example of such a known exhaust turbo-supercharger is an exhaust turbine-supercharger including an exhaust turbine unit driven by an exhaust gas and an compressor unit (intake turbine unit) driven by the exhaust turbine unit to send the outside air to a combustion chamber under pressure (see Japanese Unexamined Patent Application Publication No. 2002-70568).

The exhaust turbine unit includes an exhaust turbine housing having a spiral channel therein and an exhaust turbine provided substantially at the center in the radial direction of the exhaust turbine housing. The compressor unit includes an compressor housing having a spiral channel therein and an compressor provided substantially at the center in the radial direction of the compressor housing.

The exhaust turbine and the compressor are concentrically connected with a shaft. A bearing housing is provided between the exhaust turbine housing and the compressor housing. A bearing that rotatably supports the shaft is provided in the bearing housing.

In this exhaust turbo-supercharger, the exhaust turbine is rotationally driven by a flow of exhaust gas introduced into the exhaust turbine housing. Thereby, the compressor connected to the exhaust turbine with the shaft provided therebetween is rotationally driven. Thus, the outside air is sent by the compressor under pressure.

A heat shield component is provided between the exhaust turbine housing and the bearing housing. The heat shield component blocks the transmission of heat therebetween. Accordingly, the heat of the exhaust gas emitted from the exhaust turbine housing is not easily transmitted to the bearing in the bearing housing, thus preventing problems such as bearing seizure.

In the vicinity of the inner wall surface of the spiral channel of the exhaust turbine unit, the flow velocity of the exhaust gas flow is decreased by the frictional resistance against the inner wall surface of the channel (that is, in the exhaust gas flow, a boundary layer in which a velocity defect is generated relative to the main flow velocity is formed in the vicinity of the inner wall surface of the channel).

As a result, distortion is generated in the velocity distribution of the exhaust gas flow supplied to the exhaust turbine, resulting in an increase in impact loss at the entrance of rotor blades. Consequently, the efficiency of the exhaust turbine unit is decreased.

BRIEF SUMMARY OF THE INVENTION

The present invention has been conceived in view of the above situation, and an object of the present invention is to provide an exhaust turbo-supercharger having a high efficiency.

In order to solve the above problem, the present invention provides the following solutions.

Namely, the present invention provides an exhaust turbo-supercharger including an exhaust turbine housing including therein a spiral channel and a turbine-accommodating chamber connected to an innermost peripheral part of the spiral channel; an exhaust turbine provided in the turbine-accommodating chamber so that the axial line of the exhaust turbine is parallel to that of the spiral channel; a shaft that is concentrically connected to one side of the exhaust turbine in the axial line direction; a bearing housing disposed at the side of the exhaust turbine in the axial line direction so as to be adjacent to the exhaust turbine housing; a bearing that is provided in the bearing housing and that rotatably supports the shaft around the axial line; and a heat shield component interposed between the exhaust turbine housing and the bearing housing. In the exhaust turbo-supercharger, the heat shield component constitutes a part disposed near the entrance of the turbine-accommodating chamber, the part being a part of the inner wall surface of the spiral channel. The part composed of the heat shield component, the part being a part of the inner wall surface of the spiral channel, forms a protruding part protruding toward the inside of the channel relative to an upstream part.

In the exhaust turbo-supercharger having the above structure, in the inner wall surface of the spiral channel, a part near the entrance of the turbine-accommodating chamber is composed of the heat shield component, which is another component separated from the exhaust turbine housing. The part composed of this heat shield component forms the protruding part protruding toward the inside of the channel relative to an upstream part.

According to this structure, in the exhaust gas flowing in the spiral channel, when a boundary layer (a part of the exhaust gas flow in which a velocity defect is generated relative to the main flow velocity) formed along the inner wall surface of the spiral channel reaches the protruding part, the boundary layer is pushed out to the inside of the channel. Consequently, the flow of the boundary layer is accelerated.

Accordingly, since the velocity distortion of the exhaust gas flow supplied into the turbine-accommodating chamber can be decreased, the exhaust turbo-supercharger has a high efficiency.

Regarding the inner shape of the spiral channel of the exhaust turbine housing, high dimensional accuracy is desired in order to smooth the flow of the exhaust gas and to improve the efficiency of the exhaust turbine unit.

However, in a general exhaust turbo-supercharger, the exhaust turbine housing is produced by casting, and machining must be further performed on a part requiring high dimensional accuracy. Furthermore, since the exhaust turbine housing has a complex three-dimensional shape, it is difficult to perform machining.

In contrast, in the above-described exhaust turbo-supercharger of the present invention, the protruding part provided on the inner wall surface of the spiral channel is composed of the heat shield component, which is another component separated from the exhaust turbine housing. Therefore, the heat shield component can be formed by any forming method such as press working. Thus, the protruding part can be easily produced with high dimensional accuracy.

Accordingly, the exhaust turbo-supercharger of the present invention can be easily produced at low cost while the accuracy of the inner shape of the spiral channel is high.

In the present invention, when the width of the spiral channel in the protruding direction of the protruding part is represented by 2 L and the amount of protrusion of the protruding part is represented by X, the relationship 0.08235 L≦X≦0.6983 L may be satisfied.

According to the velocity distribution of the exhaust gas flow in the spiral channel that is calculated on the basis of an exponential law, the area where the velocity defect relative to the main flow velocity of the exhaust gas flow is less than 30% is the area that is separated from the inner wall surface of the spiral channel by more than 0.08235 L. Similarly, the area where the velocity defect relative to the main flow velocity of the exhaust gas flow is less than 5% is the area that is separated from the inner wall surface of the spiral channel by more than 0.6983 L.

Accordingly, as described above, when the amount X of protrusion of the protruding part is set to 0.08235 L or more, in the exhaust gas flow flowing between the inner wall surface adjacent to the heat shield component and the center of the spiral channel, a part of the gas flow in which the velocity defect is 30% or more of the main flow velocity is pushed out to the inside of the channel and accelerated. Consequently, the variation in the flow velocity of the exhaust gas flow can be decreased to 30% or less. In this case, the protruding part blocks about 4.1% of the channel cross-sectional area of the spiral channel.

Similarly, when the amount X of protrusion of the protruding part is set to 0.6983 L, in the exhaust gas flow flowing between the inner wall surface adjacent to the heat shield component and the center of the spiral channel, a part of the gas flow in which the velocity defect is 5% or more of the main flow velocity is pushed out to the inside of the channel and accelerated. Consequently, the variation in the flow velocity of the exhaust gas flow can be decreased to 5% or less.

On the other hand, when the amount X of protrusion of the protruding part is 0.6983 L, the protruding part blocks about 34.9% of the channel cross-sectional area of the spiral channel. When the amount X of protrusion of the protruding part is larger than this value, the flow volume of the exhaustion gas supplied to the exhaust turbine may not be satisfactorily ensured.

Therefore, the amount X of protrusion of the protruding part preferably satisfies the relationship 0.08235 L≦X≦0.6983 L.

The amount X of protrusion of the protruding part can be appropriately selected according to the performance required for the exhaust turbo-supercharger, such as the tolerance of the variation in the flow velocity of the exhaust gas flow and the lower limit of the flow volume of the exhaust gas supplied to the exhaust turbine.

For example, the area where the velocity defect relative to the main flow velocity of the exhaust gas flow is less than 20% is the area that is separated from the inner wall surface of the spiral channel by more than 0.2097 L. Therefore, when the amount X of protrusion of the protruding part is set to 0.2097 L≦X≦0.6983 L, the variation in the flow velocity of the exhaust gas flow can be decreased to 20% or less. In this case, the protruding part blocks about 10.5% of the channel cross-sectional area of the spiral channel.

Similarly, the area where the velocity defect relative to the main flow velocity of the exhaust gas flow is less than 15% is the area that is separated from the inner wall surface of the spiral channel by more than 0.3206 L. Therefore, when the amount X of protrusion of the protruding part is set to 0.3206 L≦X≦0.6983 L, the variation in the flow velocity of the exhaust gas flow can be decreased to 15% or less. In this case, the protruding part blocks about 16.5% of the channel cross-sectional area of the spiral channel.

In the present invention, a tongue separating the innermost peripheral part from a part disposed at the outer peripheral side of the innermost peripheral part, the tongue being a part of the spiral channel of the exhaust turbine housing, may be composed of a wall protruding from an inner wall surface of the exhaust turbine housing, the surface facing the bearing housing, to the bearing housing, and the heat shield component may constitute a part facing the protruding end of the tongue, the part being a part of the inner wall surface of the spiral channel.

As described above, in a general exhaust turbo-supercharger, the exhaust turbine housing is produced by casting. Therefore, the spiral channel and the turbine-accommodating chamber are integrally formed, and the exhaust turbine housing has a structure in which the spiral channel and the turbine-accommodating chamber are separated by a partition wall provided between an inner wall surface facing the bearing housing and an inner wall surface at the side of the bearing housing of the exhaust turbine housing.

According to the exhaust turbine housing having the above structure, in a tongue that is a part of the partition wall separating the spiral channel and the turbine-accommodating chamber and that constitutes a part disposed near the part connecting the spiral channel with the turbine-accommodating chamber, both the end distant from the bearing housing and the end adjacent to the bearing housing are fixed ends.

Consequently, thermal stress generated at the tongue by receiving the heat of the exhaust gas cannot be dissipated. Therefore, when the exhaust turbo-supercharger is used for a long time, cracks may be generated in the tongue.

On the other hand, as described above, when the tongue is composed of a wall protruding from an inner wall surface facing the side of the bearing housing of the exhaust turbine housing to the side of the bearing housing, an end of the tongue, the end adjacent to the bearing housing, is a free end.

According to this structure, when the tongue receives the heat of the exhaust gas, the tongue can be thermally expanded in the direction of the free end. Thus, since the thermal stress generated at the tongue can be dissipated, cracks are not easily generated in the tongue.

According to the exhaust turbo-supercharger having the above-described structure, since the velocity distortion of the exhaust gas flow supplied into the turbine-accommodating chamber can be decreased, the exhaust turbo-supercharger has a high efficiency.

DETAILED DESCRIPTION OF THE INVENTION

An embodiment of the present invention will now be described with reference to the drawings.

Figure 1:
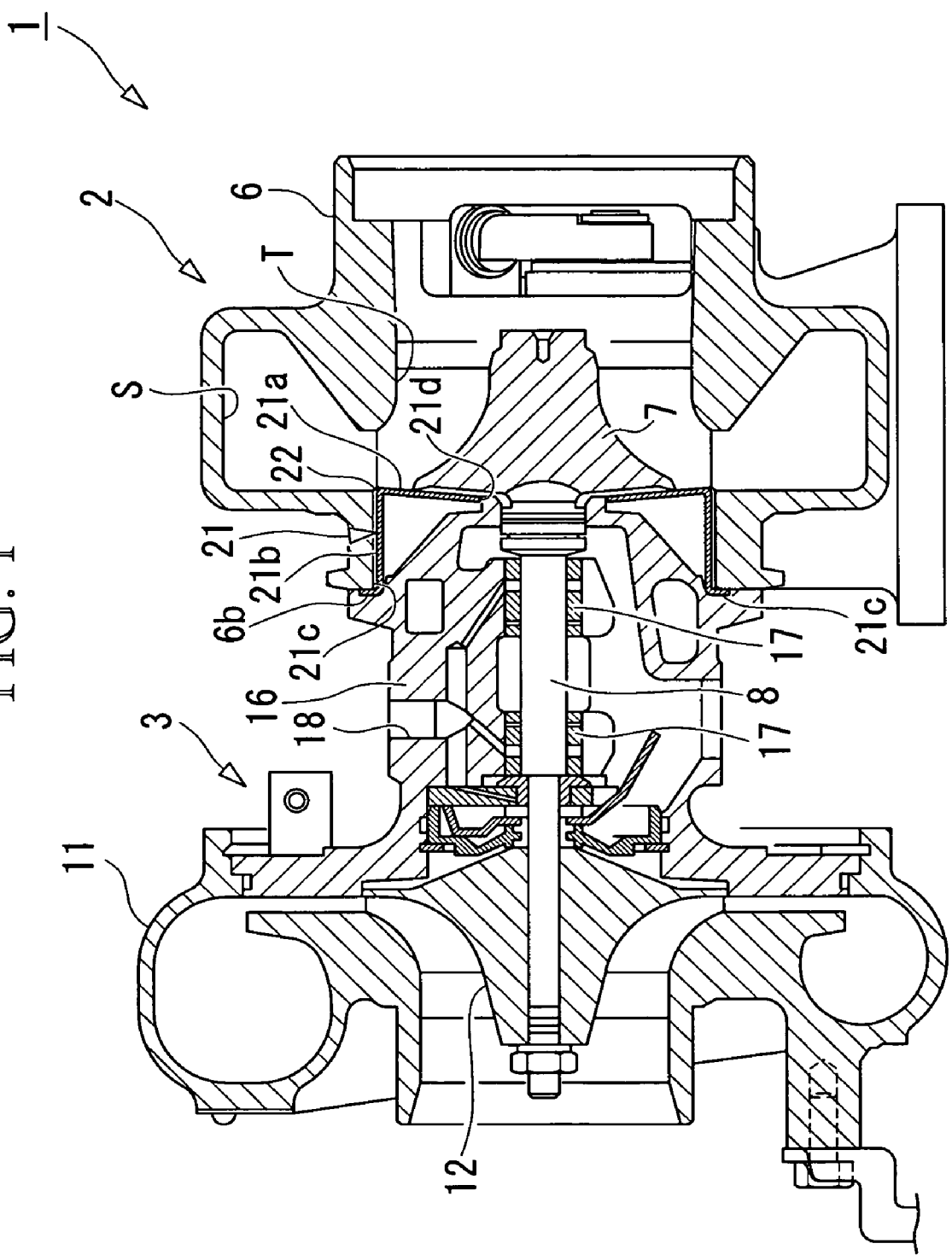
FIG. 1 is a longitudinal cross-sectional view showing the structure of an exhaust turbo-supercharger according to an embodiment of the present invention.

As shown in FIG. 1, an exhaust turbo-supercharger 1 includes an exhaust turbine unit 2 and a compressor 3. The exhaust turbine unit 2 is provided on an exhaust-gas discharging pathway of an internal combustion engine and driven by the exhaust gas. The compressor 3 is driven by the exhaust turbine unit 2 and sends the outside air to a combustion chamber of the internal combustion engine under pressure.

The exhaust turbine unit 2 includes an exhaust turbine housing 6, an exhaust turbine 7 (turbine impeller), and a shaft 8. A spiral channel S and a turbine-accommodating chamber T are provided inside the exhaust turbine housing 6. The turbine-accommodating chamber T is connected to the innermost peripheral part of the spiral channel S. The exhaust turbine 7 is provided substantially at the center in the radial direction of the turbine-accommodating chamber T so that the axial line of the exhaust turbine 7 is substantially parallel to that of the spiral channel S. The shaft 8 is substantially concentrically connected to the exhaust turbine 7 at the side of the compressor 3 (i.e., the side of a bearing housing 16 described below) in the direction of the axial line of the exhaust turbine 7.

Figure 2:
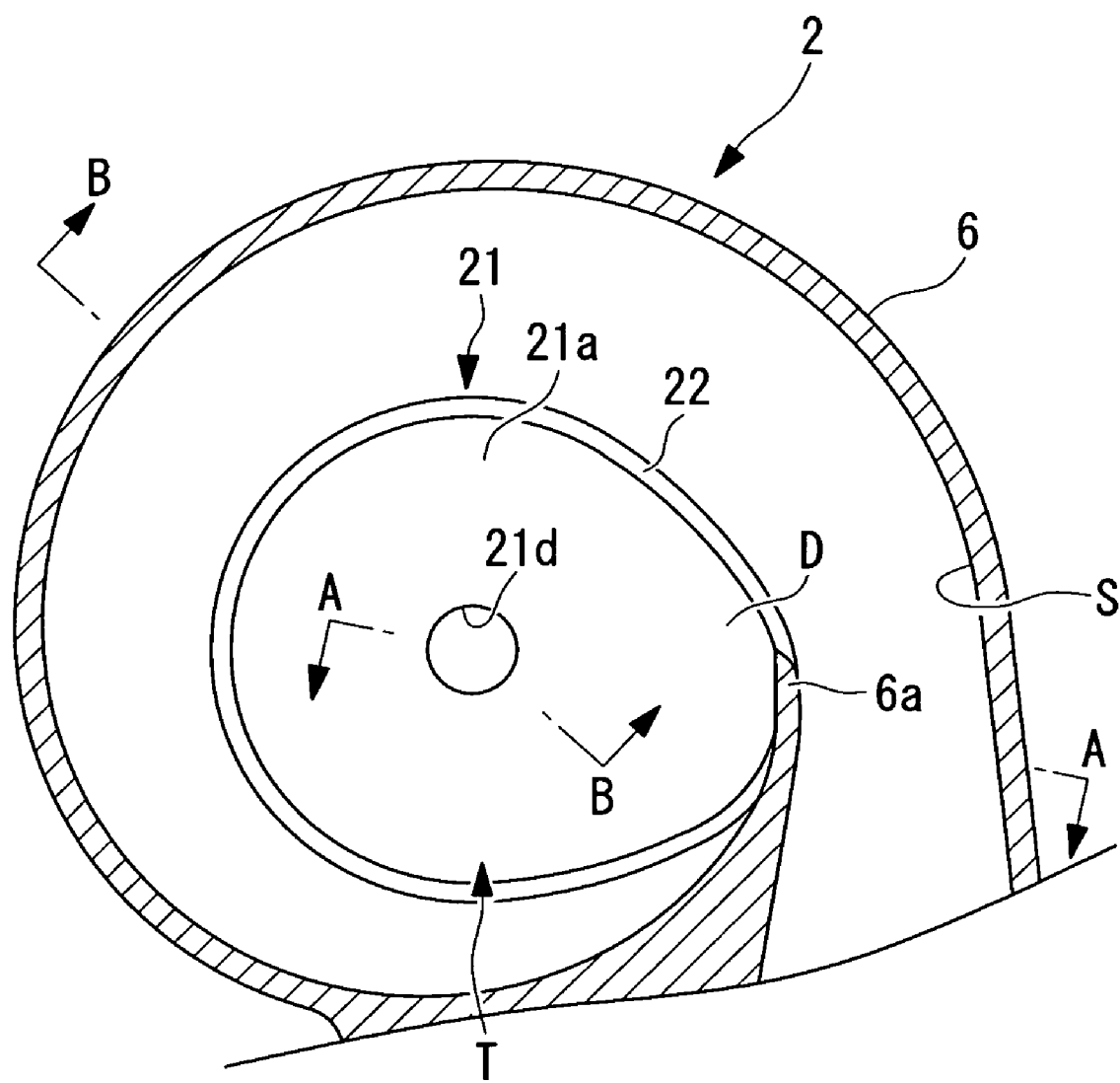
FIG. 2 is a cross-sectional view orthogonal to an axis showing the structure of an exhaust turbine unit of the exhaust turbo-supercharger according to the embodiment of the present invention.

As shown in FIG. 2, parts where the channels of the spiral channel S overlap, that is, in the spiral channel S of the exhaust turbine housing 6, the innermost peripheral part and a part disposed at the outer peripheral side of the innermost peripheral part, are separated by a tongue 6a, which is a wall protruding from the upstream side of the innermost peripheral part to the downstream side thereof.

Figure 3:
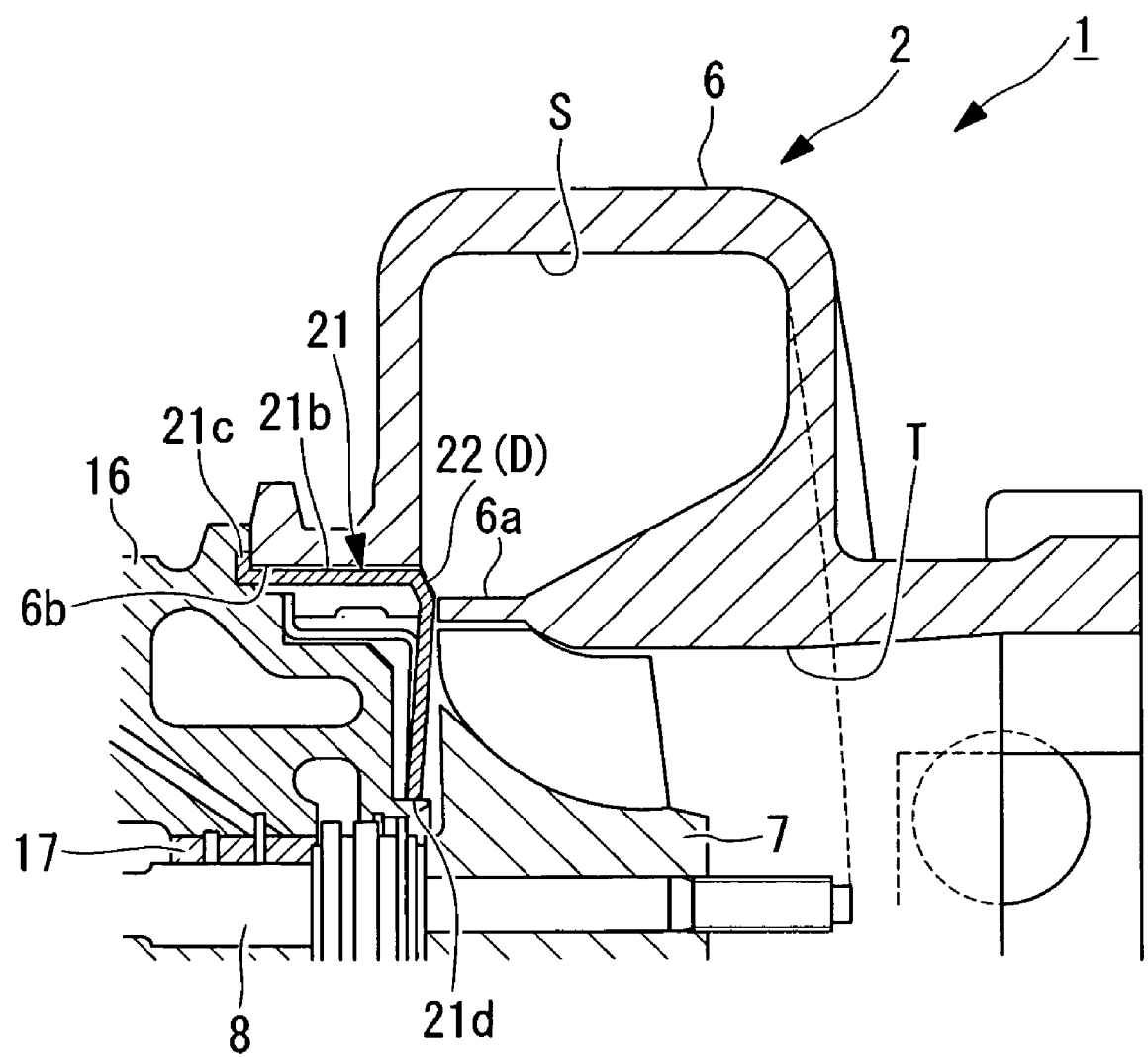
FIG. 3 is a cross-sectional view taken along arrow A-A in FIG. 2.

As shown in FIG. 3 (a cross-sectional view taken along arrow A-A in FIG. 2), this tongue 6a is composed of a wall protruding from an inner wall surface facing the side of the compressor 3 of the exhaust turbine housing 6 to the side of the compressor 3. Specifically, in the tongue 6a, an end adjacent to the compressor 3 is a free end.

As shown in FIGS. 1 to 3, in the present embodiment, the spiral channel S is formed to have such a shape that the turbine-accommodating chamber T is surrounded from the outside in the radial direction. Specifically, in this embodiment, the exhaust turbine unit 2 has a structure in which the exhaust gas is supplied from the outside in the radial direction of the exhaust turbine 7 along the radial direction (so-called radial turbine). Alternatively, the exhaust turbine unit 2 may have a structure in which the spiral channel S is provided at a position shifted to the side of the compressor 3 with respect to the exhaust turbine 7 so that the exhaust gas is supplied from a slanted direction with respect to the radial direction of the exhaust turbine 7 (so-called mixed flow turbine).

As shown in FIG. 1, the compressor 3 includes a compressor scroll 11 having a spiral channel therein and a compressor impeller 12 provided substantially at the center in the radial direction of the compressor scroll 11.

The exhaust turbine 7 of the exhaust turbine unit 2 and the compressor impeller 12 of the compressor 3 are substantially concentrically connected by the shaft 8. A bearing housing 16 is provided between the exhaust turbine housing 6 and the compressor scroll 11 so as to be adjacent to the exhaust turbine housing 6 and the compressor scroll 11.

In the exhaust turbine housing 6, an opening 6b leading to the turbine-accommodating chamber T is provided at the side of a part connecting to the bearing housing 16. The bearing housing 16 is joined to the exhaust turbine housing 6 by inserting an end adjacent to the exhaust turbine housing 6 into the opening 6b of the exhaust turbine housing 6.

A bearing 17 that rotatably supports the shaft 8 around the axial line and a lubricating system 18 that supplies the bearing 17 with lubricating oil are provided in the bearing housing 16.

Figure 4:
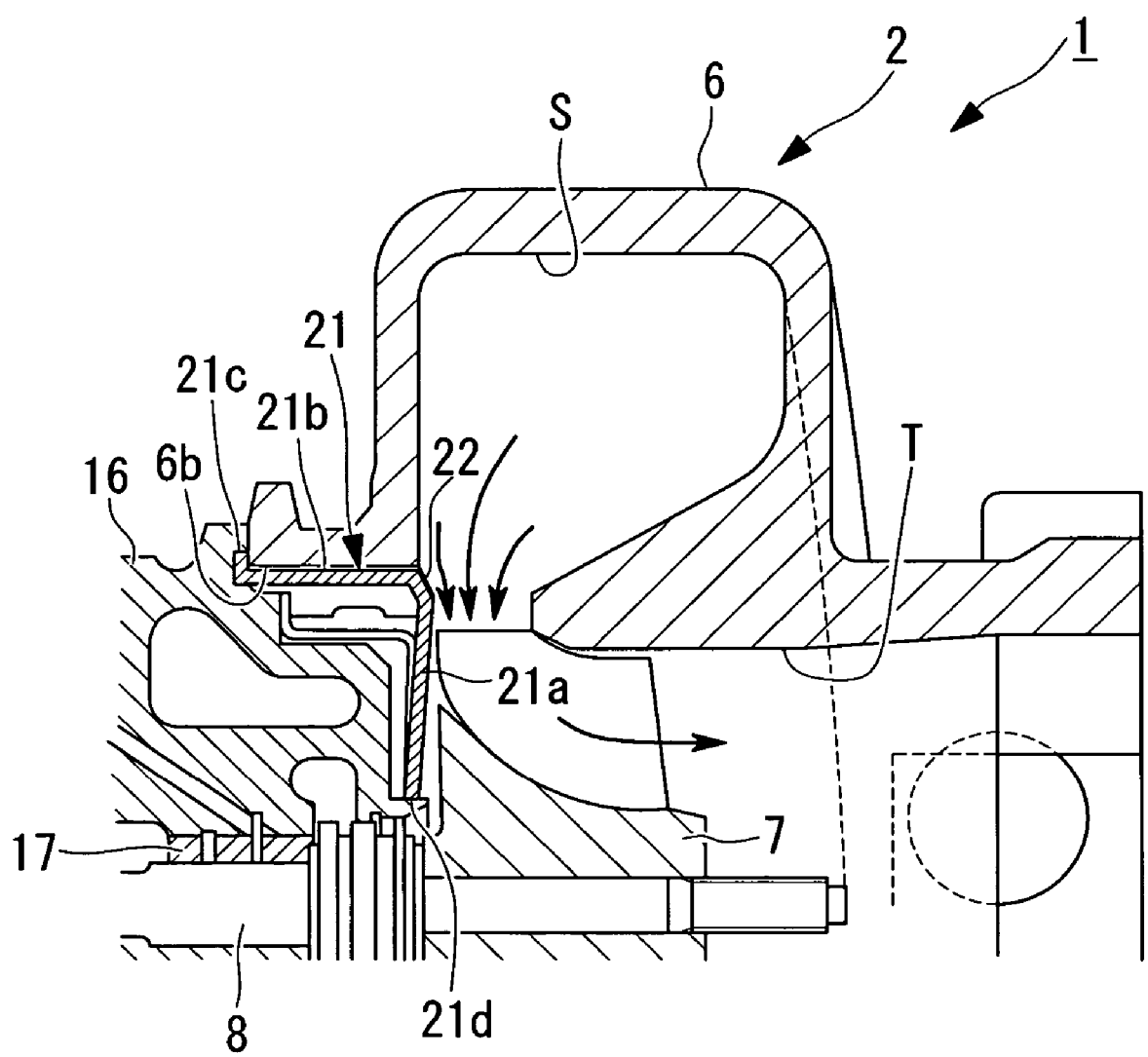
FIG. 4 is a cross-sectional view taken along arrow B-B in FIG. 2.

As shown in FIGS. 1 to 4 (FIG. 4 is a cross-sectional view taken along arrow B-B in FIG. 2), a heat shield component 21 is interposed between the exhaust turbine housing 6 and the bearing housing 16. The heat shield component 21 constitutes a part near the entrance of the turbine-accommodating chamber T in the inner wall surface of the spiral channel S. In the present embodiment, as shown in FIG. 2, the heat shield component 21 includes a projecting part (protruding part) D that projects toward the outside in the radial direction and that is provided near the tongue 6a of the spiral channel S. As shown in FIG. 3, the projecting part (protruding part) D constitutes a part facing the protruding end of the tongue 6a in the inner wall surface of the spiral channel S.

As shown in FIGS. 1, 3, and 4, the heat shield component 21 includes a substantially circular disc part 21a and a substantially cylindrical part 21b extending from the outer circumference of the substantially circular disc part 21a in a first direction of the axial line of the substantially circular disc part 21a. Thus, the heat shield component 21 has a substantially cylindrical shape with a bottom.

The heat shield component 21 is inserted in the opening 6b of the exhaust turbine housing 6 so that the substantially circular disc part 21a is disposed in the vicinity of the exhaust turbine 7.

An outer flange 21c is provided at the leading end of the substantially cylindrical part 21b. The outer flange 21c is sandwiched between the exhaust turbine housing 6 and the bearing housing 16, thereby fixing the heat shield component 21 in position.

An opening 21d is provided substantially at the center in the radial direction of the substantially circular disc part 21a. The shaft 8 is disposed through the opening 21d. An end of the bearing housing 16, the end being adjacent to the exhaust turbine housing 6, is fitted in the opening 21d, thereby fixing the heat shield component 21 in position.

In this embodiment, the circumferential part of the substantially circular disc part 21a is slanted so as to project from the outside in the radial direction to the inside in the radial direction in a second direction of the axial line. On the other hand, the inside area of the substantially circular disc part 21a, which is disposed at the inside in the radial direction relative to the above circumferential part, is slanted so as to project from the outside in the radial direction to the inside in the radial direction in the first direction of the axial line.

A part of the inner wall surface of the spiral channel S, the part being composed of the heat shield component 21, forms a protruding part 22 protruding toward the inside of the channel relative to an upstream part. In this embodiment, the protruding part 22 is composed of the circumferential part of the substantially circular disc part 21a.

Figure 6:
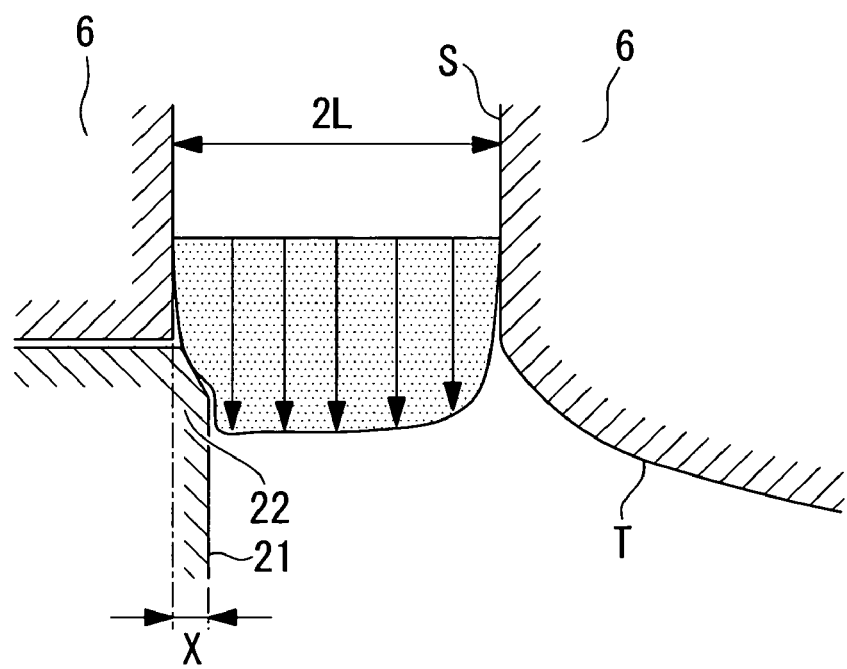
FIG. 6 is a view showing a flow velocity distribution of an exhaust gas in a spiral channel of the exhaust turbo-supercharger according to the embodiment of the present invention.

When the width of the spiral channel S in the protruding direction of the protruding part 22 is represented by 2 L and the amount of protrusion of the protruding part 22 is represented by X, the relationship $0.08235\,L \leqq X \leqq 0.6983\,L$ is satisfied (see FIG. 6).

According to the exhaust turbo-supercharger 1 having the above structure, an exhaust gas flow discharged from the internal combustion engine is fed into the exhaust turbine unit 2, thereby rotationally driving the exhaust turbine 7. When the exhaust turbine 7 is rotationally driven as described above, the compressor impeller 12 connected to the exhaust turbine 7 is rotationally driven. Thus, the outside air is sent under pressure by the compressor 3.

In this exhaust turbo-supercharger 1, a part of the inner wall surface of the spiral channel S of the exhaust turbine unit 2, the part being disposed near the entrance of the turbine-accommodating chamber T, is composed of the heat shield component 21, which is another component separated from the exhaust turbine housing 6. The part composed of the heat shield component 21 forms the protruding part 22 protruding toward the inside of the channel relative to the upstream part.

According to this structure, in the exhaust gas flowing in the spiral channel S, when a boundary layer (a part of the exhaust gas flow in which a velocity defect is generated relative to the main flow velocity) formed along the inner wall surface of the spiral channel S reaches the protruding part 22, the boundary layer is pushed out to the inside of the channel. Consequently, the flow of the boundary layer is accelerated.

Figure 5:
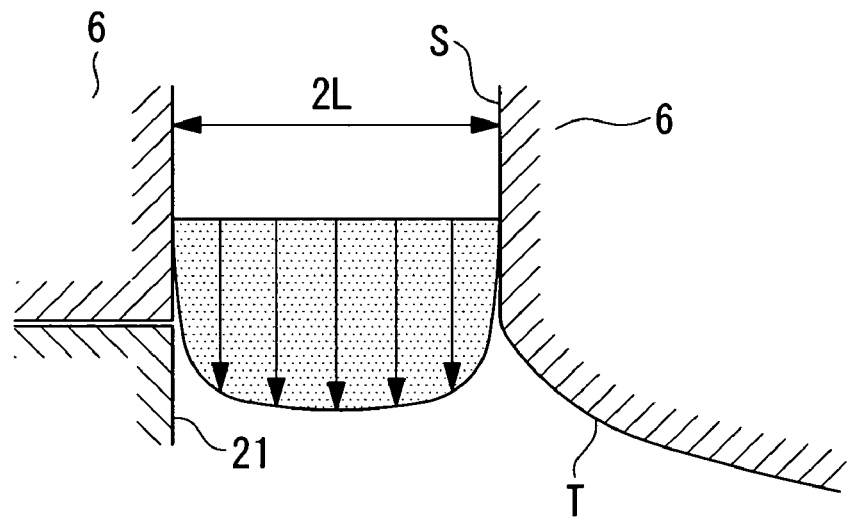
FIG. 5 is a view showing a flow velocity distribution of an exhaust gas in a spiral channel in the case where a heat shield component does not include a protruding part.

Specifically, with an exhaust turbo-supercharger not including the protruding part 22, in the vicinity of the inner wall surface of the spiral channel S, the flow velocity of the exhaust has flow is decreased by the frictional resistance against the inner wall surface of the channel (see the flow velocity distribution shown in FIG. 5). As a result, a boundary layer in which a velocity defect is generated relative to the main flow velocity of the exhaust has flow is formed in the vicinity of the inner wall surface of the spiral channel S.

In contrast, according to the exhaust turbo-supercharger 1 of this embodiment, when the boundary layer formed along the inner wall surface of the spiral channel S reaches the protruding part 22, the boundary layer is pushed out to the inside of the channel. Consequently, the flow of the boundary layer is accelerated (see the flow velocity distribution shown in FIG. 6).

Accordingly, the velocity distortion of the exhaust gas flow supplied into the turbine-accommodating chamber T can be decreased. Therefore, according to the exhaust turbo-supercharger 1 of this embodiment, the exhaust turbine unit 2 has a high efficiency.

Regarding the inner shape of the exhaust turbine housing 6, high dimensional accuracy is desired in order to smooth the flow of the exhaust gas and to improve the efficiency of the exhaust turbine unit 2.

However, in a general exhaust turbo-supercharger, the exhaust turbine housing is produced by casting, and machining must be further performed on a part requiring high dimensional accuracy. Furthermore, since the exhaust turbine housing has a complex three-dimensional shape, it is difficult to perform machining.

In contrast, in the exhaust turbo-supercharger 1 of this embodiment, the protruding part 22 provided on the inner wall surface of the spiral channel S is composed of the heat shield component 21, which is another component separated from the exhaust turbine housing 6. Therefore, the heat shield component 21 can be formed by any forming method such as press working. Thus, the protruding part 22 can be easily produced with high dimensional accuracy.

Accordingly, the exhaust turbo-supercharger 1 of this embodiment can be easily produced at low cost while the accuracy of the inner shape of the spiral channel S is high.

In the exhaust turbo-supercharger 1 of this embodiment, when the width of the spiral channel S in the protruding direction of the protruding part 22 is represented by 2 L and the amount of protrusion of the protruding part 22 is represented by X, the relationship $0.08235\ L \leq X \leq 0.6983\ L$ is satisfied.

According to the velocity distribution of the exhaust gas flow in the spiral channel S that is approximately calculated on the basis of an exponential law, specifically, a 1/7th-power velocity distribution equation $(U=U^*(X/L)^{1/7}$, wherein U represents a flow velocity, $U^*$ represents a flow velocity of the main flow, X represents the distance from an inner wall surface, and L represents the distance from the inner wall surface to the center of the channel), the area where the velocity defect relative to the main flow velocity of the exhaust gas flow is less than 30% is the area that is separated from the inner wall surface of the spiral channel S by more than 0.08235 L. Similarly, the area where the velocity defect relative to the main flow velocity of the exhaust gas flow is less than 5% is the area that is separated from the inner wall surface of the spiral channel S by more than 0.6983 L.

Accordingly, as described above, when the amount X of protrusion of the protruding part 22 is set to 0.08235 L or more, in the exhaust gas flow flowing between the inner wall surface adjacent to the heat shield component 21 and the center of the spiral channel S, a part of the gas flow in which the velocity defect is 30% or more of the main flow velocity is pushed out to the inside of the channel and accelerated. Consequently, the variation in the flow velocity of the exhaust gas flow can be decreased to 30% or less. In this case, the protruding part 22 blocks about 4.1% of the channel cross-sectional area of the spiral channel S.

Similarly, when the amount X of protrusion of the protruding part 22 is set to 0.6983 L, in the exhaust gas flow flowing between the inner wall surface adjacent to the heat shield component 21 and the center of the spiral channel S, a part of the gas flow in which the velocity defect is 5% or more of the main flow velocity is pushed out to the inside of the channel and accelerated. Consequently, the variation in the flow velocity of the exhaust gas flow can be decreased to 5% or less.

On the other hand, when the amount X of protrusion of the protruding part 22 is 0.6983 L, the protruding part 22 blocks about 34.9% of the channel cross-sectional area of the spiral channel S. When the amount X of protrusion of the protruding part 22 is larger than this value, the flow volume of the exhaustion gas supplied to the exhaust turbine 7 may not be satisfactorily ensured.

Therefore, the amount X of protrusion of the protruding part 22 preferably satisfies the relationship $0.08235\ L \leq X \leq 0.6983\ L$.

The amount X of protrusion of the protruding part 22 can be appropriately selected according to the performance required for the exhaust turbo-supercharger 1, such as the tolerance of the variation in the flow velocity of the exhaust gas flow and the lower limit of the flow volume of the exhaust gas supplied to the exhaust turbine 7.

For example, the area where the velocity defect relative to the main flow velocity of the exhaust gas flow is less than 20% is the area that is separated from the inner wall surface of the spiral channel S by more than 0.2097 L. Therefore, when the amount X of protrusion of the protruding part 22 is set to $0.2097\ L \leq X \leq 0.6983\ L$, the variation in the flow velocity of the exhaust gas flow can be decreased to 20% or less. In this case, the protruding part 22 blocks about 10.5% of the channel cross-sectional area of the spiral channel S.

Similarly, the area where the velocity defect relative to the main flow velocity of the exhaust gas flow is less than 15% is the area that is separated from the inner wall surface of the spiral channel S by more than 0.3206 L. Therefore, when the amount X of protrusion of the protruding part 22 is set to $0.3206\ L \leq X \leq 0.6983\ L$, the variation in the flow velocity of the exhaust gas flow can be decreased to 15% or less. In this case, the protruding part 22 blocks about 16.5% of the channel cross-sectional area of the spiral channel S.

In a known general exhaust turbo-supercharger, the exhaust turbine housing is produced by casting. Therefore, the spiral channel and the turbine-accommodating chamber are integrally formed, and the exhaust turbine housing has a structure in which the spiral channel and the turbine-accommodating chamber are separated by a partition wall provided between an inner wall surface facing the bearing housing and an inner wall surface at the side of the bearing housing of the exhaust turbine housing.

According to the exhaust turbine housing having the above structure, in a tongue that is a part of the partition wall separating the spiral channel and the turbine-accommodating chamber and that constitutes a part disposed near the part connecting the spiral channel with the turbine-accommodating chamber, both the end distant from the bearing housing and the end adjacent to the bearing housing are fixed ends.

Consequently, thermal stress generated at the tongue by receiving the heat of the exhaust gas cannot be dissipated. Therefore, when the exhaust turbo-supercharger is used for a long time, cracks may be generated in the tongue.

On the other hand, in the exhaust turbo-supercharger 1 of this embodiment, the tongue 6a separating the innermost peripheral part and a part disposed at the outer peripheral side of the innermost peripheral part in the spiral channel S of the exhaust turbine housing 6 is composed of a wall protruding from an inner wall surface facing the side of the compressor 3 of the exhaust turbine housing 6 (the side of the bearing housing 16) to the side of the compressor 3. The heat shield component 21 constitutes a part facing the protruding end of the tongue 6a in the inner wall surface of the spiral channel S.

Accordingly, in the tongue 6a, an end adjacent to the compressor 3 is a free end. When the tongue 6a receives the heat of the exhaust gas, the tongue 6a can be thermally expanded in the direction of the free end. According to this structure, since the thermal stress generated at the tongue 6a can be dissipated, cracks are not easily generated in the tongue 6a.

What is claimed is:

1. An exhaust turbo-supercharger comprising:
   an exhaust turbine housing including therein a spiral channel and a turbine-accommodating chamber at an innermost peripheral part of the spiral channel;
   an exhaust turbine provided in the turbine-accommodating chamber so that the axial line of the exhaust turbine is parallel to that of the spiral channel;
   a shaft that is concentrically connected to one side of the exhaust turbine in the axial line direction;
   a bearing housing disposed at the side of the exhaust turbine in the axial line direction so as to be adjacent to the exhaust turbine housing;
   a bearing that is provided in the bearing housing and that rotatably supports the shaft around the axial line; and
   a heat shield component immovably interposed between the exhaust turbine housing and the bearing housing and arranged with the exhaust turbine housing and the bearing housing so as to seal a space between the turbine housing and the bearing housing to prevent the ingress of hot exhaust gas into the space,
   wherein the heat shield component constitutes a part disposed near the entrance of the turbine-accommodating chamber, the part being a part of an inner wall surface of the spiral channel,
   a circumferential part of the heat shield component the circumferential part protruding into the spiral channel, and
   wherein when the width of the spiral channel in the protruding direction of the protruding part is represented by 2 L and the amount of protrusion of the protruding part is represented by X, a fixed relationship $0.08235 L \leq X \leq 0.6983 L$ is satisfied.

2. The exhaust turbo-supercharger according to claim 1, further comprising a tongue forming a part of the spiral channel of the exhaust turbine housing, the tongue being unitarily formed with the turbine housing in manner to be free of contact with the heat shield, the tongue separating an innermost peripheral part of the spiral channel from an upstream part of the spiral channel, and wherein:
   the heat shield component has a part facing an edge of a protruding end of the tongue and forms a part of the inner wall surface of the spiral channel.

3. The exhaust turbo-supercharger according to claim 1, wherein the heat shield component has a flange which is sandwiched between the exhaust gas turbine housing and the bearing housing.

4. The exhaust turbo-supercharger according to claim 3, wherein the heat shield component has an essentially annular configuration having an essentially cylindrical peripheral wall portion which is configured to rest against a surface of the exhaust gas turbine housing and which terminates in the flange at a first end, and which merges with an annular wall portion that is exposed to exhaust gas flow, via a chamfer-like protruding part at a second end.

5. The exhaust turbo-supercharger according to claim 3, wherein the annular wall portion is arranged at an acute angle with respect to the cylindrical wall portion.

6. The exhaust turbo-supercharger according to claim 3, wherein at least the chamfer-like protrusion part is arranged to project into the gas flow in the exhaust gas turbine housing in a manner which deflects and accelerates the exhaust gas flow moving toward the exhaust gas turbine.

* * * * *